US008812018B2

(12) United States Patent
Cooper et al.

(10) Patent No.: US 8,812,018 B2
(45) Date of Patent: Aug. 19, 2014

(54) SYSTEM AND METHOD FOR PREDICTING FUTURE LOCATIONS OF MOBILE COMMUNICATION DEVICES USING CONNECTION-RELATED DATA OF A MOBILE ACCESS NETWORK

(75) Inventors: William T. Cooper, Henderson, CO (US); Kumar Thangamuthu, San Francisco, CA (US)

(73) Assignee: Unwired Planet, LLC, Reno, NV (US)

( * ) Notice: Subject to any disclaimer, the term of this patent is extended or adjusted under 35 U.S.C. 154(b) by 442 days.

(21) Appl. No.: 13/192,384

(22) Filed: Jul. 27, 2011

(65) Prior Publication Data

US 2012/0028650 A1    Feb. 2, 2012

Related U.S. Application Data

(60) Provisional application No. 61/368,325, filed on Jul. 28, 2010.

(51) Int. Cl.
*H04M 3/00* (2006.01)
*H04W 24/00* (2009.01)

(52) U.S. Cl.
USPC ............ 455/456.1; 455/418; 455/456.5; 455/456.6

(58) Field of Classification Search
USPC ........ 455/404.2, 405–409, 432.1–432.3, 433, 455/435.1–435.2, 436–441, 456.1–456.6, 455/457, 418–421, 459, 550.1, 556.2, 455/560–561; 340/994; 701/32.3, 300, 701/446–447, 516–517, 519
See application file for complete search history.

(56) References Cited

U.S. PATENT DOCUMENTS

| | | | |
|---|---|---|---|
| 8,023,958 B2* | 9/2011 | Wang et al. | 455/456.1 |
| 2009/0024546 A1* | 1/2009 | Ficcaglia et al. | 706/12 |
| 2009/0054043 A1* | 2/2009 | Hamilton et al. | 455/414.2 |
| 2010/0070334 A1* | 3/2010 | Monteverde | 705/10 |
| 2010/0137002 A1* | 6/2010 | Agarwal et al. | 455/456.1 |
| 2010/0279708 A1* | 11/2010 | Lidsrom et al. | 455/456.1 |
| 2010/0323715 A1* | 12/2010 | Winters | 455/456.1 |
| 2012/0023223 A1* | 1/2012 | Branch et al. | 709/224 |

OTHER PUBLICATIONS

Semun Lee, Jeongkeun Lee, Taekyoung Kwon and Yanghee Choi, "Use of AGPS Call Data Records for Non-GPS Terminal Positioning in Cellular Networks," in Proc. WINSYS 2006, Portugal, Aug. 2006.
Nathan Eagle, Aaron Clauset and John A. Quinn, "Location Segmentation, Inference and Prediction for Anticipatory Computing," AAAI Spring Symposium on Technosocial Predictive Analytics, Stanford, 2009.

* cited by examiner

*Primary Examiner* — Meless Zewdu

(57) ABSTRACT

A system and method for predicting future locations of mobile communication devices utilizes connection-related data from a mobile access network supporting the mobile communication devices to determine latest locations of the mobile communication devices, which are used to predict the future locations of the mobile communication devices. In addition to the determined locations of the mobile communication devices, carrier-provided location predictive indicators and/or non-carrier location predictive indicators may be used to improve the accuracy of the predicted future locations.

18 Claims, 3 Drawing Sheets

SYSTEM AND METHOD FOR PREDICTING FUTURE LOCATIONS OF MOBILE COMMUNICATION DEVICES USING CONNECTION-RELATED DATA OF A MOBILE ACCESS NETWORK

CROSS-REFERENCE TO RELATED APPLICATION

This application is entitled to the benefit of provisional U.S. Patent Application Ser. No. 61/368,325, filed Jul. 28, 2010, which is incorporated herein by reference.

BACKGROUND

Mobile communication devices are widely used among various user groups. Conventional mobile communication devices allow users to communicate with one another via voice, text, and multimedia messages. Also, many mobile communication devices allow users to access information available over the Internet. Thus, mobile communication devices increase the ability and the number of ways that people can communicate with each other.

With the wide use of mobile communication devices, there is a strong demand to provide location-based services based on the current locations of the mobile communication devices. However, there is also demand to provide location-based services based on predicted future locations of the mobile communication devices. Conventional processes for predicting future locations of mobile communication devices are based solely on past locations of the mobile communication devices that were previously determined at various times in the past.

There are various techniques to determine the current locations of mobile communication devices, which can be used to predict the future locations of the mobile communication devices. Some of these location techniques are handset-based techniques, which require special hardware, such as a Global Positioning System (GPS), and/or software in the mobile communication devices to provide geographical location information of the mobile communication devices to the network access provider. Other location techniques are network-based techniques, which require the network infrastructure of the network access providers to extract the geographical location information of the mobile communication devices using various location data transmitted between the network access providers and the mobile communication devices.

A concern with the handset-based location techniques is that not all mobile communication devices may have the appropriate hardware and/or software to provide the geographical location information, which means a different location technique must be used to determine the locations of these mobile communication devices. A concern with the network-based location techniques is that the constant process of determining the locations of the mobile communication devices will significantly tax the network infrastructure, causing latencies due to the calculations preformed to determine the locations of the mobile communication devices.

In addition to these concerns with respect to the location techniques, a concern with conventional processes to predict future locations of the mobile communication devices is that there can be poor correlations between historic locations of the mobile communication devices with future locations of the mobile communication devices for various situations.

In view of the above concerns, there is a need for a system and method for predicting future locations of mobile communication devices in a more accurate manner without requiring special hardware and/or software in the mobile communication devices, and without significantly taxing the network infrastructure.

SUMMARY

A system and method for predicting future locations of mobile communication devices utilizes connection-related data from a mobile access network supporting the mobile communication devices to determine latest locations of the mobile communication devices, which are used to predict the future locations of the mobile communication devices. In addition to the determined locations of the mobile communication devices, carrier-provided location predictive indicators and/or non-carrier location predictive indicators may be used to improve the accuracy of the predicted future locations.

A system for predicting future locations of mobile communication devices in accordance with an embodiment of the invention comprises a data extracting module, a location module and a predictive analytics module. The data extracting module is operably connected to a mobile access network supporting the mobile communication devices. The data extracting module is configured to extract connection-related data that includes cell identifiers for the mobile communication devices from the mobile access network. The location module is operably connected to the data extracting module. The location module is configured to process the connection-related data to retrieve the cell identifiers for the mobile communication devices to determine latest locations of the mobile communication devices with respect to cell areas supported by the mobile access network. The predictive analytics module is operably connected to the location module. The predictive analytics module is configured to perform predictive analytics using at least the determined latest locations of the mobile communication devices to predict future locations of the mobile communication devices. The operations of the data extracting module, the location module and the predictive analytics module are executed using one or more processors.

A method for predicting future locations of mobile communication devices in accordance with an embodiment of the invention comprises extracting connection-related data that includes cell identifiers for the mobile communication devices from a mobile access network supporting the mobile communication devices, processing the connection-related data to retrieve the cell identifiers for the mobile communication devices to determine latest locations of the mobile communication devices with respect to cell areas supported by the mobile access network, and performing predictive analytics using at least the determined latest locations of the mobile communication device to predict future locations of the mobile communication devices. In another embodiment, the predictive analytics is performed using location predictive indicators from the mobile access network, as well as the determined latest locations of the mobile communication device, to predict the future locations of the mobile communication devices.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
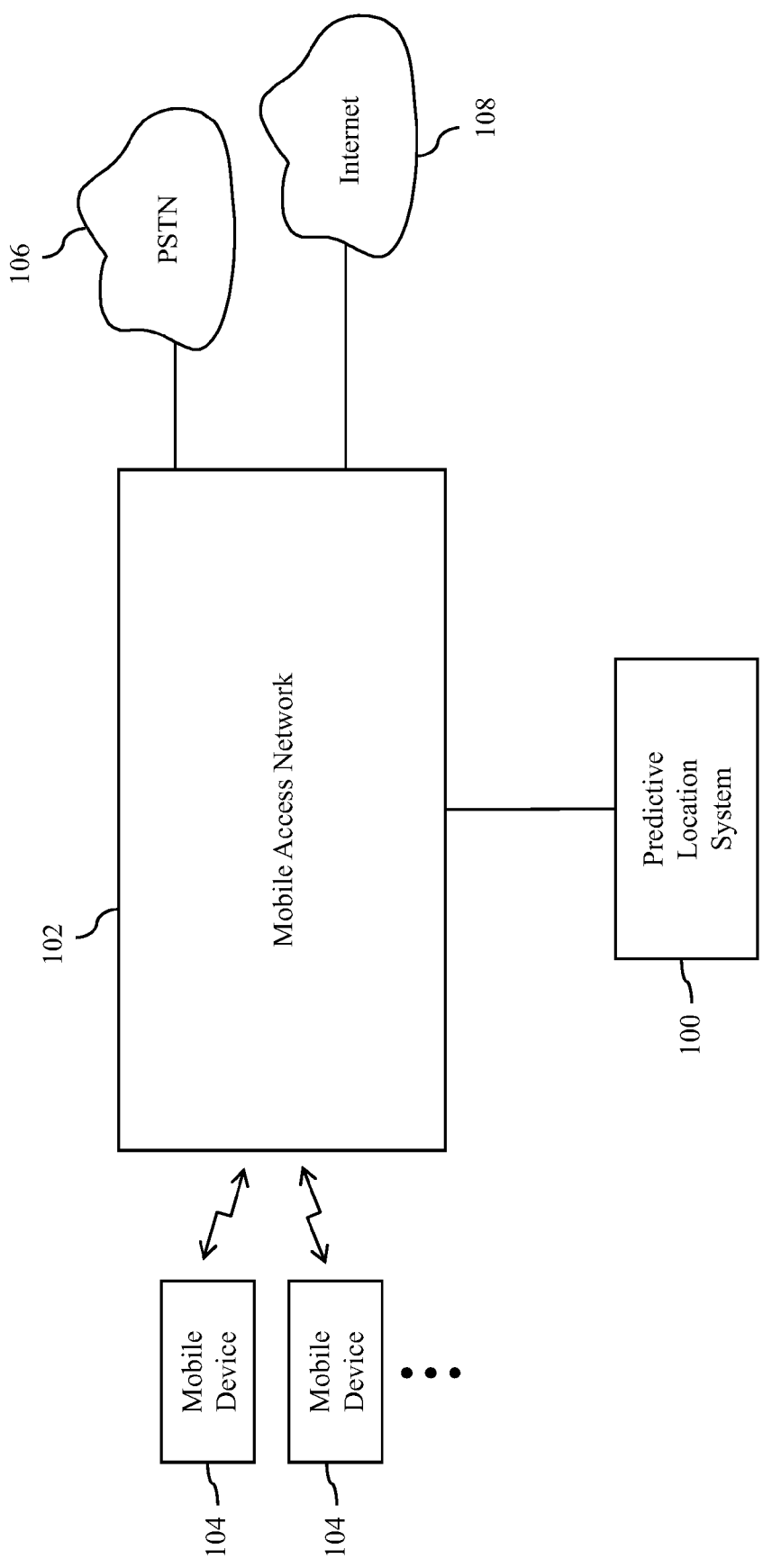
FIG. 1 is a block diagram of a mobile communication network that includes a predictive location system in accordance with an embodiment of the invention.

Turning now to FIG. 1, a mobile communication network that includes a predictive location system 100 in accordance with an embodiment of the invention is shown. As shown in FIG. 1, the mobile communication network includes a mobile access network 102, which allows mobile communication devices 104 to access the public switched telephone network (PSTN) 106 and/or the Internet 108 via the mobile access network. The mobile access network may also be connected to other networks (not shown), such as private telephone networks and/or data networks. In the illustrated embodiment, the predictive location system is connected to the mobile access network. As described in more detail below, the predictive location system operates to determine the latest locations of the mobile communication devices supported by the mobile access network using connection-related data used by the mobile access network and to predict future locations of the mobile communication devices using at least the determined locations of the mobile communication devices. In some embodiments, the predictive location system uses supplemental location predictive indicators of the mobile communication devices and/or subscribers, which may be provided by the carrier or third parties (i.e., non-carrier entities). Using the connection-related data, the predictive location system is able to determine the latest locations of the mobile communication devices without the need for special hardware and/or software in the mobile communication devices and without significantly taxing the network infrastructure, i.e., the mobile access network. In addition, using the supplemental location predictive indicators, the predictive location system is able to more accurately predict the future locations of the mobile communication devices when compared to using only past locations of the mobile communication devices.

The mobile access network 102 can be any type of a mobile access network, such as a Universal Mobile Telecommunication System (UMTS) network or a CDMA2000 network, which provides communication services for the mobile communication devices 104. The mobile communication devices are wireless mobile devices that are subscribed to the communication services of the mobile access network. The mobile communication devices can be any type of wireless mobile devices, such as laptop computers, cell phones, smartphones, personal digital assistants (PDAs) and netbooks. The mobile communication devices may be Internet-enabled devices. Thus, some of the mobile communication devices can access the Internet 108 via the mobile access network. Since the mobile access network provides communication services, including access to the Internet, the mobile access network handles and processes various communications between the mobile communication devices and the mobile access network and information relating to the mobile communication devices supported by the mobile access network, which are used by the predictive location system 100 to passively determine the latest locations of the mobile communication devices, as described in more detail below.

The predictive location system 100 operates to determine the latest locations of the communication devices 104 supported by the mobile access network 102 using connection-related data that contains cell identifiers, such as cell identification names or cell sector names, which is used by the mobile access network. The connection-related data is non-GPS information and not location data commonly used for location determination of mobile communication devices. The connection-related data may include (1) billing records, such as call detail records (CDRs) of voice, short message service (SMS) messages or multimedia message service (MMS) messages, (2) authentication, authorization and accounting (AAA) information, (3) mobility messages, and (4) other data in the mobile access network that contains cell identifiers. The cell identifiers in the connection-related data are used to determine the latest locations of the mobile communication devices with respect to corresponding cell areas, such as cell sites or cell sectors, supported by the mobile access network. Thus, the level of location accuracy is based on the size of cell areas contained within the total area supported by the mobile access network or its roaming partners.

The predictive location system further operates to predict future locations of the mobile communication devices using at least the determined locations of the mobile communication devices. In some embodiments, the predictive location system may also use carrier-provided location predictive indicators of the mobile communication devices and/or subscribers to increase the accuracy of the predicted future locations of the mobile communication devices. In some embodiments, the predictive location system may also use noncarrier-provided location predictive indicators of the mobile communication devices and/or subscribers to further increase the accuracy of the predicted future locations of the mobile communication devices.

Figure 2:
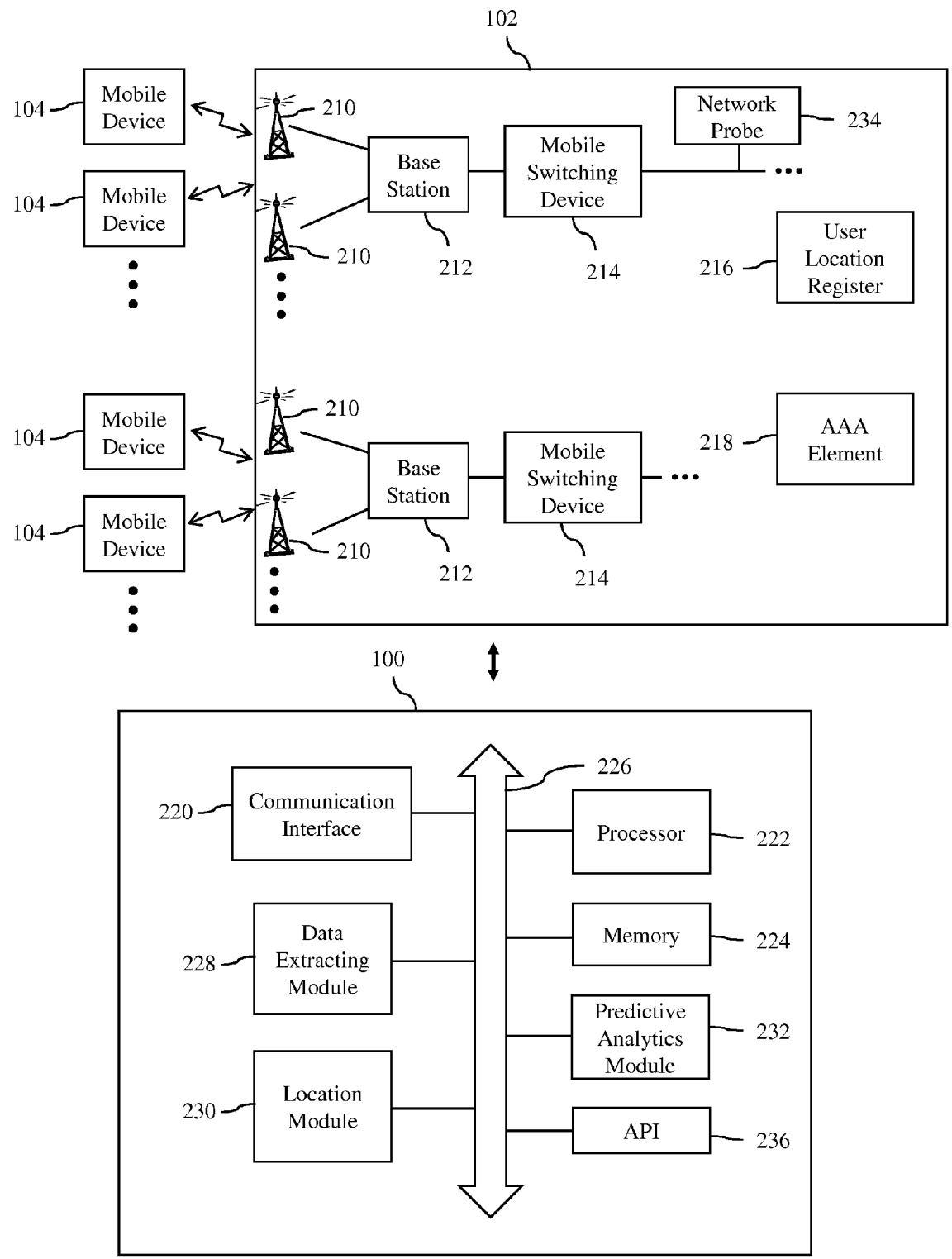
FIG. 2 is a block diagram of the predictive location system, which shows components of the predictive location system in accordance with an embodiment of the invention

Turning now to FIG. 2, the components of the predictive location system 100 in accordance with an embodiment of the invention are shown. In FIG. 2, some components of the mobile access network 102 are also shown to better describe the predictive location system. In particular, signaling tower stations 210, base stations 212, mobile switching devices 214, a user location register 216, an AAA element 218 and various signal paths of the mobile access network are shown. Each of the signaling tower stations includes an antenna tower and electronic components to receive and transmit wireless signals. The signaling tower stations may be base transmission stations (BTSs), Node Bs or other equivalent components, depending on the mobile access network. The base stations are connected to one or more signaling tower stations. The base stations may be base station controllers (BSCs), radio network controller (RNCs) or other equivalent components, depending on the mobile access network. The mobile switching devices may be mobile switching centers (MSCs) or other equivalent components, depending on the mobile access network. The user location register is operably connected to the mobile switching devices. The user location register includes subscriber information, such as account information, account status, user preferences and subscribed features. The user location register may be a home location register (HLR) or its equivalent database, depending on the mobile access network. The AAA element may be a device or server that performs operations related to authorization, authentication and accounting for the mobile communication devices, and thus, manage AAA information for the mobile communication devices.

As shown in FIG. 2, the predictive location system 100 includes a communication interface 220, at least one processor 222 and at least one memory 224 that are connected to a data bus 226. The communication interface enables communications with other devices, such as components of the mobile access network 102 and external servers, via, for example, Internet Protocol (IP). The processor may include a multifunction processor and/or an application-specific processor. The processor can be any processor commonly found in a server. The memory can be any type of computer memory, such as read only memory (ROM), flash memory, random access memory (RAM) or a hard disk drive.

The predictive location system 100 further includes a data extracting module 228, a location module 230 and a predictive analytics module 232, which are connected to the data bus 226. In an embodiment, the data extracting module, the location module and the predictive analytics module are implemented as software stored in a computer readable medium, such as the memory 224, which is executed by the processor 222 to perform the operations of these module. However, in other embodiments, each of the data extracting module, the location module and the predictive analytics module may be implemented in any combination of software, firmware and hardware. In some embodiments, the predictive location system may be implemented as one or more servers with the data extracting module, the location module and the predictive analytics module residing in one or more of these servers.

The data extracting module 228 is operably connected to the mobile access network 102 via the communication interface 220 and is configured to extract the connection-related data that contains cell identifiers that are used by the mobile access network 102. In some embodiments, the data extracting module is connected to one or more components of the mobile access network to extract the connection-related data from the mobile access network. In these embodiments, the extraction of the connection-related data from the mobile access network may involve sending a query message from the data extracting module to one or more components of the mobile access network to request the connection-related data, which is then transmitted to the data extracting module. Alternatively, the extraction of the connection-related data from the mobile access network may involve accessing one or more components of the mobile access network to retrieve the connection-related data from the components. As an example, the data extracting module may extract CDRs from the mobile access network by sending a request for the CDRs to the user location register 216, e.g., a HLR, the base stations 212, e.g., BSCs and/or the mobile switching devices 214, e.g., MSCs, of the mobile access network, or their equivalent components depending the mobile access network, and receiving the requested CDRs. As another example, the data extracting module may extract AAA information from the mobile access network by sending a request for the AAA information, such as a Remote Authentication Dial In User Service (RADIUS) request, to the AAA element 218 of the mobile access network, and receiving the requested AAA information.

In other embodiments, the data extracting module 228 may be connected to one or more network probes 234, which are connected to signal paths of the mobile access network 102 to extract the connection-related data being transmitted within the mobile access network along the signal paths. The network probes are configured to make copies of the data being transmitted on the signal paths being monitored, which can then be retrieved by or provided to the data extracting module. As an example, the data extracting module may extract mobility messages being transmitted within the mobile access network using one or more network probe 234 strategically situated on the signal paths of the mobile access network.

The location module 230 is operably connected to the data extracting module 228 to receive the extracted connection-related data. The location module is configured to process the connection-related data to retrieve the necessary information, such as the cell identifiers, identifications of the mobile communication devices 104 (e.g., International Mobile Subscriber Identities (IMSIs)), time and date information and server switch identifications, to determine the latest locations of the mobile communication devices. In some embodiments, the location module uses a base station almanac to correlate the cell identifiers with the corresponding cell areas, which may be specified by centroids of the serving cell areas defined by geographical coordinates, e.g., latitude and longitude, to determine the latest locations of the mobile communication devices. These latest locations of the mobile communication devices are associated with the identifications of the mobile communication devices and the time and date information as location data, and stored in at least one location database, which may be stored in the memory 224 or any other memory accessible by the predictive location system 100. The location module is configured to periodically determine the latest locations of the mobile communication devices and store them in the location database to maintain historic location data of the mobile communication devices. Thus, past locations of the mobile communication devices are maintain in the location database.

The predictive analytics module 232 is operably connected to the memory 224 or the memory in which the location database is stored to access the location data in the location database. The predictive analytics module is configured to perform predictive analytics using the location data, which includes past locations of the mobile communication devices 104, to predict future locations of the mobile communication devices. Thus, the predictive analytics module is able determine the most likely location of a particular mobile communication device at given time and date, and the most likely future location of a particular mobile communication device given its actual current location, i.e., the latest location of that mobile communication device as determined by the location module 230. As an example, the predictive analytics module may use neural network, Bayesian and/or conditional probability techniques to predict future locations of the mobile communication devices using the location data stored in the location database.

In some embodiments, the predictive analytics module 232 may be configured to also use or factor in location predictive indicators provided by the carrier, i.e., the mobile access network 102. These carrier-provided location predictive indicators may be any data regarding the mobile communication devices 104 and/or the associated subscribers or customers that includes predictive information of future locations of the mobile communication devices, such as billing data, point of sale data, service call data and customer profile data. The billing data includes account information of the subscribers, which may include home addresses and/or work addresses of the subscribers. The point of sale data includes information regarding the purchase of the mobile communication devices. The service call data includes information regarding any service calls made regarding the mobile communication devices. The customer profile data includes information regarding features and/or installed programs of the mobile communication devices, such as games, applications, navigation, voice-to-text and voicemail-to-text. The carrier-provided location predictive indicators may be retrieved directly from the network access network by the data extracting module 228 or other component of the predictive location system 100. Alternatively, the carrier-provided location predictive indicators may be uploaded into the memory 224 or other memory accessible by the predictive location system as one or more datasets or databases to be used by the predictive analytics module.

In some embodiments, the predictive analytics module 232 may also or alternatively be configured to use or factor in location predictive indicators provided by one or more third party entities, which are referred to herein as noncarrier-provided location predictive indicators. As used herein, a third party entity is any entity other than the carrier and the subscribers that has information regarding the mobile communication devices 104 or the associated subscribers. These third party entities may include shopping website providers, consumer product sellers, service providers and consumer information providers, such as surveying and rating companies. The location predictive indicators provided by these third party entities include data regarding the mobile communication devices and/or the associated subscribers or customers that includes predictive information of future locations of the mobile communication devices. As an example, shopping data for camping equipment may indicate future travel plans to nearby campsite that have been visited in the past as indicated by the location data determined and stored by the location module 230. As another example, airline ticket purchases and hotel reservations would indicate very likely future locations for the associated mobile communication devices. The noncarrier-provided location predictive indicators may be uploaded into the memory 224 or other memory accessible by the predictive location system 100 as one or more datasets or databases to be used by the predictive analytics module.

The predictive analytics module 232 can uses the noncarrier-provided location predictive indicators with or without the carrier-provided location predictive indicators, along with the location data that include past locations as well as the latest locations of the mobile communication devices, to provide more accurate predictions regarding the future locations of the mobile communication devices 104. With the predicted future locations of the mobile communication devices, various location-based services can be selectively targeted to the mobile communication devices based on the predicted future locations.

The predictive location system 100 further includes an application programming interface (API) 236 that can interface with requesting applications, which may be applications in remote external devices, to present the predicted locations of the mobile communication devices 104 that have been calculated by the predictive analytics module 232. As an example, the requesting applications may be mobile advertisement targeting engines. The API may also be configured to provide an option for subscribers to control which applications have access to their predicted locations.

Figure 3:
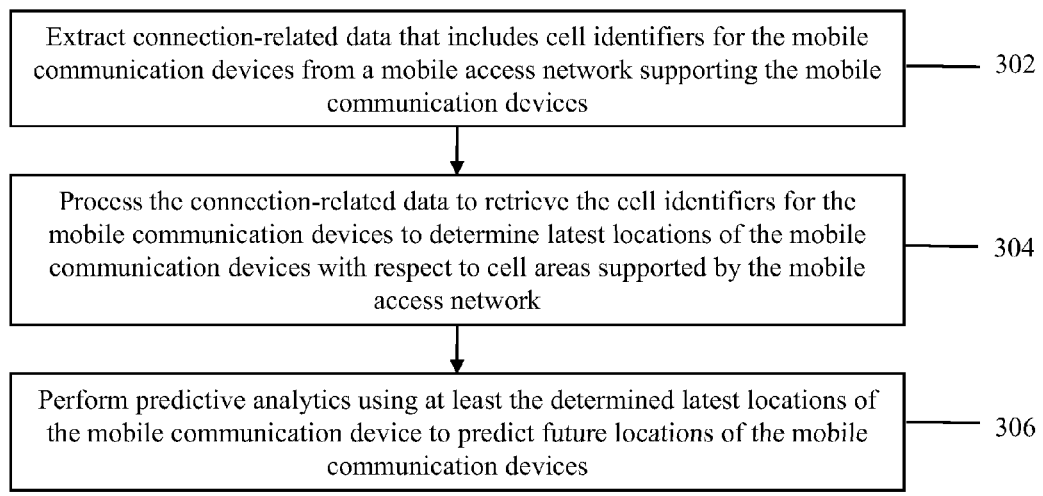
FIG. 3 is a flow diagram of a method for predicting future locations of mobile communication devices in accordance with an embodiment of the invention.

A method for predicting future locations of mobile communication devices in accordance with an embodiment of the invention is described with reference to a flow diagram of FIG. 3. At block 302, connection-related data that includes cell identifiers for the mobile communication devices is extracted from a mobile access network supporting the mobile communication devices. At block 304, the connection-related data is processed to retrieve the cell identifiers for the mobile communication devices to determine latest locations of the mobile communication devices with respect to the cell areas supported by the mobile access network. At block 306, predictive analytics is performed using at least the determined latest locations of the mobile communication device to predict future locations of the mobile communication devices.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for predicting future locations of mobile communication devices, the system comprising:
    a data extracting module operably connected to a mobile access network supporting the mobile communication devices, the data extracting module configured to extract connection-related data from the mobile access network, the connection-related data being primarily used by the mobile access network for purposes other than location determination, the connection-related data including cell identifiers for the mobile communication devices;
    a location module operably connected to the data extracting module, the location module configured to process the connection-related data to retrieve the cell identifiers to determine latest locations of the mobile communication devices with respect to cell areas supported by the mobile access network; and
    a predictive analytics module operably connected to the location module, the predictive analytics module configured to perform predictive analytics using at least the determined latest locations of the mobile communication devices to predict the future locations of the mobile communication devices, the predictive analytics module being further configured to use carrier-provided location predictive indicators for the mobile communication devices in addition to the determined latest locations of the mobile communication devices to predict the future locations of the mobile communication devices,
    wherein operations of the data extracting module, the location module and the predictive analytics module are executed using one or more processors.

2. The system of claim 1, wherein the connection-related data includes billing records, wherein the data extracting module is configured to extract the billing records from one or more components of the mobile access network, and wherein the location module is configured to process the billing records to retrieve the cell identifiers from the billing records.

3. The system of claim 2, wherein the billing records are call detail records, wherein the data extracting module is configured to extract the call detail records from one or more components of the mobile access network, and wherein the location module is configured to process the call detail records to retrieve the cell identifiers from the call detail records.

4. The system of claim 1, wherein the connection-related data includes authentication, authorization and accounting (AAA) information, wherein the data extracting module is configured to extract the authentication, authorization and accounting information from one or more components of the mobile access network, and wherein the location module is configured to process the authentication, authorization and accounting information to retrieve the cell identifiers from the authentication, authorization and accounting information.

5. The system of claim 1, wherein the connection-related data includes mobility messages, wherein the data extracting module is configured to extract the mobility messages from the mobile access network, and wherein the location module is configured to process the mobility messages to retrieve the cell identifiers from the mobility messages.

6. The system of claim 1, wherein the data extracting module is connected to one or more network probes on at least one signal path of the mobile access network to receive the connection-related data from the one or more network probes.

7. The system of claim 1, wherein the predictive analytics module is configured to use noncarrier-provided location predictive indicators for the mobile communication devices in addition to the determined latest locations of the mobile communication devices and the carrier-provided location predictive indicators to predict the future locations of the mobile communication devices.

8. The system of claim 1, wherein the predictive analytics module is configured to use noncarrier-provided location predictive indicators for the mobile communication devices in addition to the determined latest locations of the mobile communication devices to predict the future locations of the mobile communication devices.

9. A computer-implemented method for predicting future locations of mobile communication devices, the method comprising:
    extracting connection-related data from a mobile access network, the connection-related data being primarily used by the mobile access network for purposes other than location determination, the connection-related data including cell identifiers for the mobile communication devices;
    processing the connection-related data to retrieve the cell identifiers to determine latest locations of the mobile communication devices with respect to cell areas supported by the mobile access network; and
    performing predictive analytics using at least the determined latest locations of the mobile communication devices to predict the future locations of the mobile communication devices wherein the performing the predictive analytics includes using carrier-provided location predictive indicators for the mobile communication devices in addition to the determined latest locations of the mobile communication devices.

10. The method of claim 9, wherein the connection-related data includes billing records, wherein the extracting includes extracting the billing records from one or more components of the mobile access network, and wherein the processing includes processing the billing records to retrieve the cell identifiers from the billing records.

11. The method of claim 10, wherein the billing records are call detail records, wherein the extracting includes extracting the call detail records from one or more components of the mobile access network, and wherein the processing includes processing the call detail records to retrieve the cell identifiers from the call detail records.

12. The method of claim 9, wherein the connection-related data includes authentication, authorization and accounting (AAA) information, wherein the extracting includes extracting the authentication, authorization and accounting information from one or more components of the mobile access network, and wherein the processing includes processing the authentication, authorization and accounting information to retrieve the cell identifiers from the authentication, authorization and accounting information.

13. The method of claim 9, wherein the connection-related data includes mobility messages, wherein the extracting includes extracting the mobility messages from the mobile access network, and wherein the processing includes processing the mobility messages to retrieve the cell identifiers from the mobility messages.

14. The method of claim 9, wherein the extracting includes receiving the connection-related data from one or more network probes on at least one signal path of the mobile access network.

15. The method of claim 9, wherein the performing the predictive analytics includes using noncarrier-provided location predictive indicators for the mobile communication devices in addition to the determined latest locations of the mobile communication devices and the carrier-provided location predictive indicators.

16. The method of claim 9, wherein the performing the predictive analytics includes using noncarrier-provided location predictive indicators for the mobile communication devices in addition to the determined latest locations of the mobile communication devices to predict the future locations of the mobile communication devices.

17. A computer-implemented method for predicting future locations of mobile communication devices, the method comprising:
  extracting connection-related data from a mobile access network, the connection-related data being primarily used by the mobile access network for purposes other than location determination, the connection related data including cell identifiers for the mobile communication devices;
  processing the connection-related data to retrieve the cell identifiers to determine latest locations of the mobile communication devices with respect to cell areas supported by the mobile access network; and
  performing predictive analytics using at least the determined latest locations of the mobile communication devices and location predictive indicators from the mobile access network to predict the future locations of the mobile communication devices wherein the performing the predictive analytics includes using carrier-provided location predictive indicators for the mobile communication devices in addition to the determined latest locations of the mobile communication devices.

18. The method of claim 17, wherein the connection-related data includes authentication, authorization and accounting (AAA) information or mobility messages.

* * * * *